United States Patent
Lee et al.

(10) Patent No.: US 6,790,005 B2
(45) Date of Patent: Sep. 14, 2004

(54) COMPOUND TIP NOTCHED BLADE

(75) Inventors: Ching-Pang Lee, Cincinnati, OH (US); David Glenn Cherry, Loveland, OH (US); Chander Prakash, Cincinnati, OH (US); Aspi Rustom Wadia, Loveland, OH (US)

(73) Assignee: General Electric Company, Schenectady, NY (US)

( * ) Notice: Subject to any disclaimer, the term of this patent is extended or adjusted under 35 U.S.C. 154(b) by 0 days.

(21) Appl. No.: 10/334,091

(22) Filed: Dec. 30, 2002

(65) Prior Publication Data

US 2004/0126236 A1 Jul. 1, 2004

(51) Int. Cl.⁷ .................................................. F01D 5/16
(52) U.S. Cl. ..................................................... 416/97 R
(58) Field of Search ............................... 415/115, 116, 415/173.1, 173.4; 416/92, 96 R, 96 A, 97 R, 224

(56) References Cited

U.S. PATENT DOCUMENTS

| | | |
|---|---|---|
| 4,142,824 A | 3/1979 | Andersen |
| 4,893,987 A | 1/1990 | Lee et al. |
| 5,261,789 A | 11/1993 | Butts et al. |
| 5,476,364 A | 12/1995 | Kildea |
| 5,503,527 A | 4/1996 | Lee et al. |
| 5,564,902 A | 10/1996 | Tomita |
| 5,660,523 A | 8/1997 | Lee |
| 6,039,531 A | 3/2000 | Suenaga et al. |
| 6,059,530 A * | 5/2000 | Lee .......................... 416/97 R |
| 6,086,328 A | 7/2000 | Lee |
| 6,164,914 A * | 12/2000 | Correia et al. ............ 416/97 R |
| 6,224,336 B1 * | 5/2001 | Kercher ..................... 416/97 R |
| 6,527,514 B2 * | 3/2003 | Roeloffs .................... 416/97 R |
| 6,554,575 B2 * | 4/2003 | Leeke et al. ................ 416/224 |
| 6,595,749 B2 * | 7/2003 | Lee et al. .................. 416/97 R |
| 6,672,829 B1 * | 1/2004 | Cherry et al. ............... 415/115 |

OTHER PUBLICATIONS

U.S. application No. 10/196,623; filed Jul. 16, 2002, Cherry et al.

* cited by examiner

Primary Examiner—Christopher Verdier
(74) Attorney, Agent, or Firm—William S. Andes; Francis L. Conte

(57) ABSTRACT

A gas turbine engine blade includes pressure and suction sidewalls extending between leading and trailing edges and from root to tip. The pressure sidewall includes an inclined tip rib offset therein by a ramp defining a tip notch having compound inclinations.

20 Claims, 2 Drawing Sheets

COMPOUND TIP NOTCHED BLADE

BACKGROUND OF THE INVENTION

The present invention relates generally to gas turbine engines, and, more specifically, to turbine blade cooling therein.

In a gas turbine engine, air is pressurized in a compressor and mixed with fuel in a combustor for generating hot combustion gases which flow downstream through turbine stages that extract energy therefrom. A high pressure turbine powers the compressor, and a low pressure turbine powers an upstream fan in a turbofan aircraft engine embodiment.

The first stage turbine blades first receive the hot combustion gases from the combustor and are typically air cooled by using air bled from the compressor. Turbine blade cooling is quite esoteric and the art is well crowded in view of the complex nature of blade cooling.

A typical turbine blade includes a generally concave pressure side and an opposite, generally convex suction side extending axially or chordally between leading and trailing edges which extend radially in span from root to tip of the blade. The airfoil portion of the blade is hollow and extends radially outwardly from a supporting dovetail which mounts the blade in a supporting rotor disk.

Cooling air is channeled to each blade through the dovetail and various internal passages are formed inside the airfoil for tailoring cooling thereof to mitigate the various heat loads experienced around the outer surface of the airfoil.

The radially outer end or tip of the airfoil is particularly difficult to cool since it is exposed to hot combustion gases along both the pressure and suction sides of the airfoil as well as in the radial clearance or gap formed with the surrounding stator casing or shroud. Since turbine blades are subject to occasional tip rubs, the airfoil tip is typically formed by squealer rib extensions of the pressure and suction sides which join together at the leading and trailing edges and define an open tip plenum therebetween having a floor which encloses the internal passages of the airfoil.

A significant advancement in blade tip cooling is U.S. Pat. No. 5,261,789 which discloses the use of a tip shelf along the pressure side of the turbine blade. The tip shelf is fed with cooling air through holes formed therethrough and interrupts the flow of combustion gases along the pressure side of the blade tip. Improved cooling of the blade tip including the pressure side tip rib is obtained.

During operation, combustion gases flow axially over the pressure and suction sides of the airfoil, with a portion thereof migrating radially upwardly along the pressure side and over the pressure side tip rib where it leaks past the airfoil tip in the small gap formed with the shroud. The resulting flow field of the combustion gases and cooling air discharged from the tip shelf is complex and affects both aerodynamic performance of the airfoil and cooling of the tip ribs themselves which are solid members extending upwardly from the tip floor.

Although the tip shelf and ribs are relatively small features of the airfoil, the importance thereof cannot be overstated since oxidation of the tip and material lost therefrom limits the useful life of the blade. The tip ribs are typically manufactured by casting with the entirety of the blade itself, and the small tip shelf may also be formed by casting or by electrical discharge machining (EDM) where required or practical. In either manufacturing method, the pressure side tip rib and cooperating tip shelf have dimensions measured in several mils, and are thus subject to manufacturing tolerances which affect the performance thereof.

Furthermore, the individual tip ribs are subject to centrifugal loading during operation which generates corresponding stress at the bases thereof with the tip floor. And, the tip shelf joins the pressure side tip rib at a correspondingly small fillet at which centrifugal stress may be concentrated during rotation of the blades in operation.

Accordingly, it is desired to provide a turbine blade having improved tip cooling notwithstanding manufacturing tolerances and centrifugal loads.

BRIEF DESCRIPTION OF THE INVENTION

A gas turbine engine blade includes pressure and suction sidewalls extending between leading and trailing edges and from root to tip. The pressure sidewall includes an inclined tip rib offset therein by a ramp defining a tip notch having compound inclinations.

BRIEF DESCRIPTION OF THE DRAWINGS

The invention, in accordance with preferred and exemplary embodiments, together with further objects and advantages thereof, is more particularly described in the following detailed description taken in conjunction with the accompanying drawings in which.

DETAILED DESCRIPTION OF THE INVENTION

Figure 1:
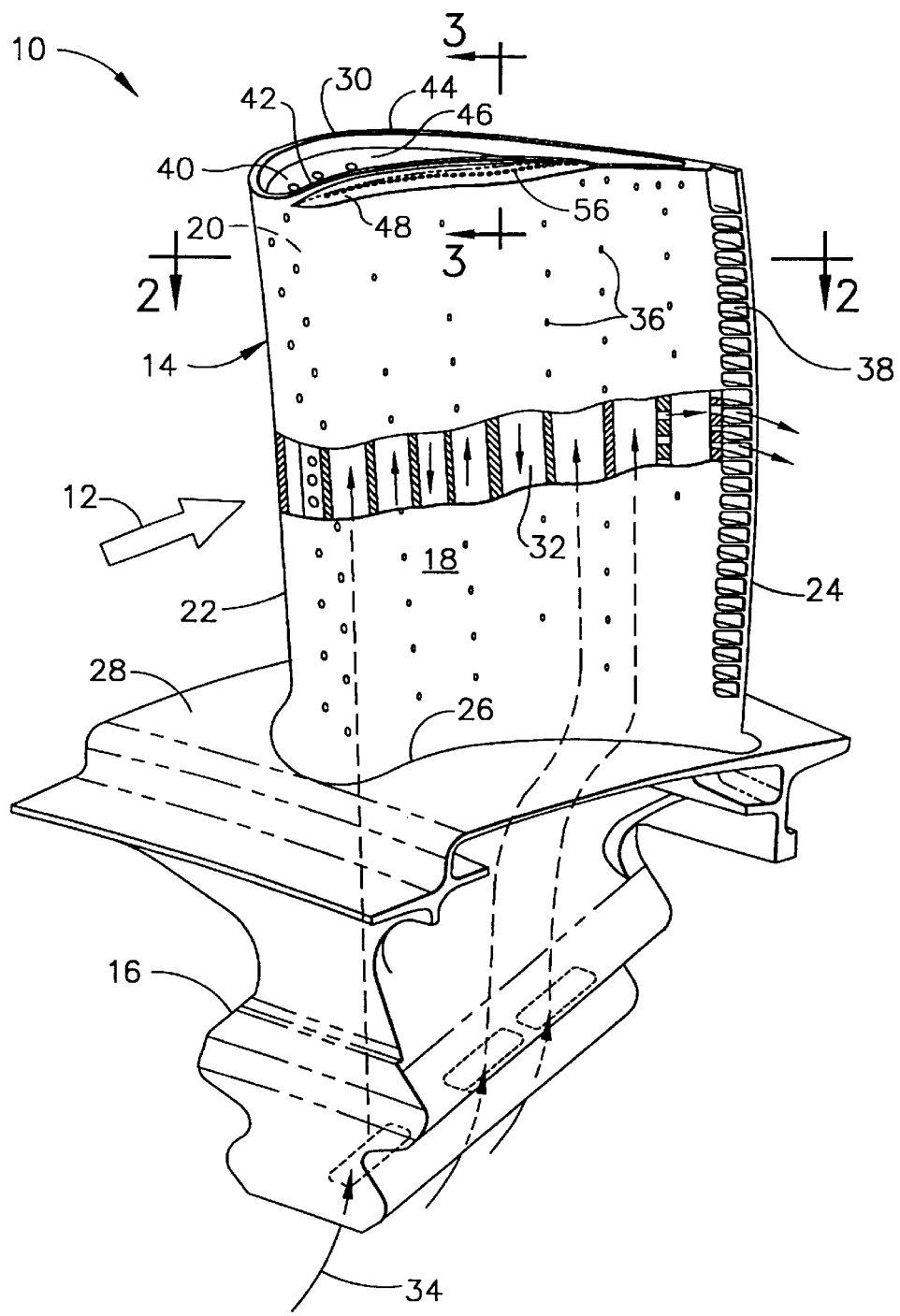
FIG. 1 is an isometric view of a gas turbine engine first stage rotor blade having blade tip cooling in accordance with an exemplary embodiment of the present invention.

Illustrated in FIG. 1 is an exemplary first stage turbine rotor blade 10 for a gas turbine engine over which is channeled hot combustion gases 12 during operation. The blade includes a hollow airfoil 14 integrally joined to a mounting dovetail 16 typically formed in a common casting. The airfoil is configured for extracting energy from the combustion gases. And, the dovetail is configured for securing the blade in the perimeter of a rotor disk (not shown) which is rotated during operation.

Figure 2:
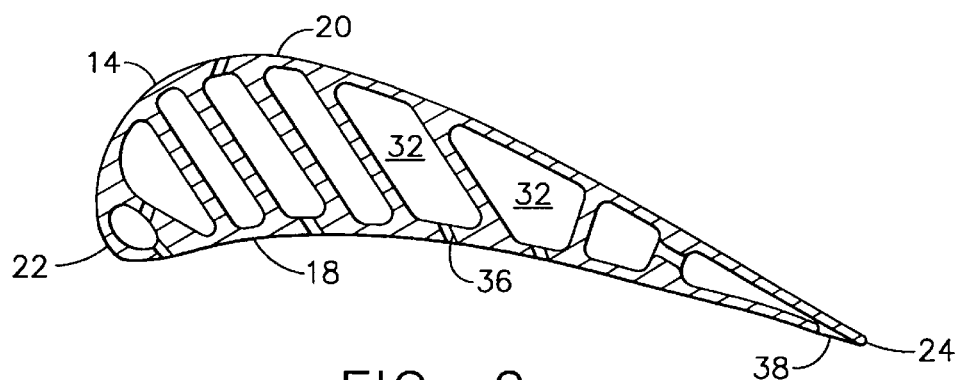
FIG. 2 is a radial sectional view through a portion of the blade airfoil illustrated in FIG. 1 and taken generally along line 2—2.

As shown in FIGS. 1 and 2, the airfoil has a crescent-shaped aerodynamic profile including opposite pressure and-suction sidewalls 18,20 which extend axially or chordally between opposite leading and trailing edges 22,24. The airfoil sides also extend radially in longitudinal span from a root 26 at an integral blade platform 28 to a radially outer tip 30.

The hollow airfoil may have any conventional internal cooling circuit 32 and typically includes multiple internal flow passages having suitable inlets in the dovetail 16 through which cooling air 34 is received from a compressor (not shown) of the engine for use as a coolant in cooling the blade during operation.

As shown in FIG. 2, there are nine internal flow passages extending radially inside the airfoil for preferentially cooling the various portion thereof. The first two passages at the airfoil leading edge provide dedicated impingement cooling of the leading edge. The two passages in front of the trailing edge 24 provide dedicated cooling of the thin trailing edge region of the airfoil. And the five intermediate passages are arranged in a five-pass serpentine circuit for cooling the middle of the airfoil.

The airfoil includes various radial rows of film cooling holes 36 through the pressure and suction sidewalls of the airfoil as required for providing effective cooling thereof. And, the airfoil includes a row of trailing edge discharge holes 38 for discharging the cooling air from the last two internal passages axially outwardly along the trailing edge.

Figure 3:
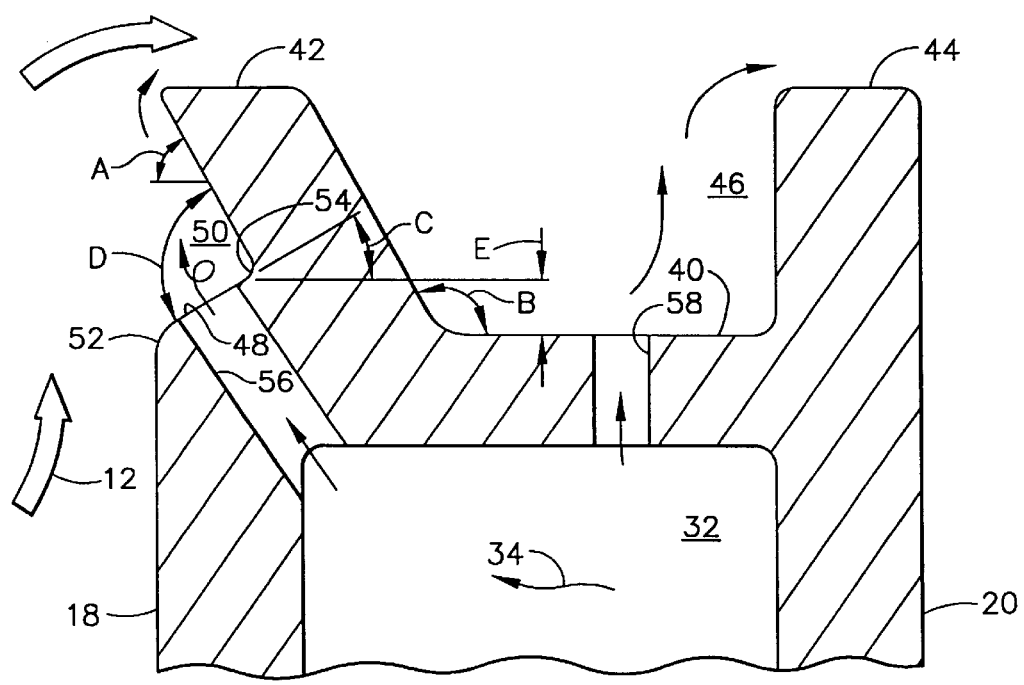
FIG. 3 is an elevational sectional view through the airfoil illustrated in FIG. 1 and taken along line 3—3.

As shown in FIG. 3, a generally flat tip floor 40 bridges the airfoil pressure and suction sidewalls and encloses the several internal passages therein. The tip floor is bounded by integral first and second squealer tip ribs 42,44 extending along the pressure and suction sidewalls, respectively, and joining each other at the leading and trailing edges of the airfoil. The pressure and suction side ribs 42,44 surround the blade tip and extend upwardly from the floor to define an open tip cavity or plenum 46.

As best illustrated in FIG. 3, the pressure side or first squealer rib 42 is inclined outwardly from the tip plenum at an acute inclination angle A relative to the tip floor or horizontal axis, and has a base offset or recessed inwardly from the pressure sidewall 18 to form an exposed outboard inclined shelf or ramp 48. The ramp extends from the pressure sidewall to the first rib and defines a substantially normal notch 50 therebetween. Since both the first rib and the ramp are inclined to define the notch 50, the notch has compound angles of inclination, with the two legs thereof having a generally L-shaped configuration and are preferably orthogonal or normal to each other.

Since the first rib 42 is inclined from the tip floor, it bounds the pressure side of the tip plenum 46 at an obtuse included angle B between the corresponding surfaces thereof.

Correspondingly, the tip ramp 48 is inclined upwardly at an acute inclination angle C from an arcuate bullnose 52 at the juncture with the pressure sidewall 18 to join the first rib at an arcuate fillet 54. The bullnose provides a smooth external corner between the ramp and pressure sidewall, and the fillet provides a smooth internal corner with the first rib. And, the compound notch 50 extends chordally along the first rib 42 over a suitable distance between the leading and trailing edges of the airfoil as illustrated in FIG. 1. The notch decreases in size and blends as it terminates at suitable locations near the leading and trailing edges.

The airfoil tip illustrated in FIGS. 1 and 3 also includes a row of film cooling apertures 56 extending from the internal cooling circuit 32 through the juncture of the pressure sidewall and tip floor to reach the ramp 48 for providing cooling air thereto during operation.

The compound angled, pressure side, tip notch 50 may be used to provide substantial advantages in the aerodynamic and structural performance of the turbine blade, and in the casting manufacture thereof. The cooling air is discharged from the internal cooling circuit through the ramp apertures 56 to fill with film cooling air the tip notch 50 along the outboard surface of the first rib 42. The air in the notch can create a strong recirculation zone and provide enhanced thermal protection of the first rib 42.

Furthermore, the inclination of the first rib 42 causes the spent cooling air from the notch to be discharged over the top of the first rib as a barrier to the combustion gas flow thereover which in turn is bounded by the radially outer shroud (not shown). The obtuse turning angle of the cooling air around the pressure side rib 42 provides another recirculation zone over the top of the first rib which aerodynamically restrains passage of the combustion gases through the blade tip gap. In this way, efficiency of the turbine may be improved.

In the preferred embodiment illustrated in FIG. 3, the ramp 48 is substantially straight in cross section from the bullnose 52 to the fillet 54 and is disposed higher in elevation than the tip floor 40 inside the tip plenum. The two squealer ribs 42,44 have a preferred height measured from the top of the tip floor 40 conventionally determined to minimize the possibility of blade tip rubbing during operation while ensuring the structural integrity of the squealer ribs for minimizing combustion gas leakage through the tip gap. Since the ramp 48 is higher than the tip floor it reduces the radial distance from the outlet of the ramp apertures 56 to the top of the first rib 42 and correspondingly enhances the cooling of the first rib 42 due to the limited cooling capability of the discharged cooling air.

The preferred compound inclination of the tip notch 50 permits the first rib 42 to overhang the ramp 48, and preferably terminate with the top corner of the first rib substantially vertically or radially aligned over the outer surface of the pressure sidewall 18. In this configuration, the notch 50 has a generally L-shape with substantially normal or orthogonal legs. This configuration permits the compound notch to be readily formed in the original casting of the entire turbine blade since the mold or die material filling the notch may be readily removed from the notch in the casting process. Or, the notch may be formed by EDM, if desired.

Accordingly, the inclined first rib 42 illustrated in FIG. 3 overhangs the inclined ramp in the pressure side of the airfoil and deflects outwardly the radially outwardly migrating combustion gases for discouraging combustion gas leakage in the small gap between the tip and the surrounding shroud. The compound angled tip notch places the ramp closer to the top of the first rib and enhances film cooling thereof.

Correspondingly, the ramp apertures extend through the additional tip material provided by the ramp being inclined upwardly as well as being higher in elevation than the tip floor for providing more internal surface area within the ramp apertures in which more convection cooling may occur. The film air discharged from the ramp apertures travels a shorter distance to the overhanging first rib for obtaining improved film cooling effectiveness due to the compound notch, as well as reducing the amount of air mixing with the radially migrating combustion gases.

The compound inclination of the tip notch permits a relatively large included notch angle D which improves the ability to accurately cast the compound notch in the original blade casting, as compared with an acute included angle in this region. The typical tip shelf used in the patent identified in the Background section is horizontal or parallel with the tip floor of the blade, and if used with an inclined pressure side squealer rib it would form a relatively small acute angle therewith rendering less practical the casting of this feature in the original manufacture.

Furthermore, such a horizontal tip shelf cooperating with an inclined pressure side squealer rib would correspondingly have a relatively small fillet therebetween having a corresponding stress concentration. During rotary operation of the turbine blades, centrifugal loads would be developed in the inclined tip rib, with the centrifugal stresses generated at the base thereof near the acute shelf fillet being concentrated thereby.

In contrast, the ramp illustrated in FIG. 3 is inclined to complement the inclination of the first rib 42 and create a substantially normal or orthogonal included angle D therebetween, which normal angle is substantially greater than the corresponding acute angle if the ramp were re-configured horizontally in the form of the conventional tip shelf.

The inclined pressure side squealer rib 42 has these several advantages in aerodynamic and structural performance over the conventional horizontal tip shelf, as well as being readily formed by casting in the original blade, or subsequently by EDM. However, the suction side second squealer rib 44 is disposed downstream from the first rib 42 and is not subject to radially outward migration of the combustion gases on the pressure sidewall.

Accordingly, the second rib 44 preferably bounds the suction side of the tip cavity 46 at a substantially normal or orthogonal angle with the tip floor 40, with a fillet at the juncture therebetween.

Correspondingly, the tip floor 40 preferably includes a plurality of floor apertures 58 extending radially outwardly from the internal cooling circuit 32 and through the floor either perpendicularly or at an inclination therethrough in flow communication with the tip plenum 46. The cooling air 34 is thereby additionally channeled into the tip plenum 46 for cooling the inboard surfaces thereof including those of the first and second tip ribs, with the cooling air from the plenum then being discharged therefrom downstream over the top of the second rib 44.

In this configuration of outwardly inclined first rib 42 and normal second rib 44, the tip plenum 46 diverges radially outwardly for locally recirculating the cooling air therein, as well as for being readily castable during the original manufacture of the blade.

In the preferred embodiment illustrated in FIG. 3, the inclination angle C of the inclined ramp 48 is within the range of about 10 degrees to about 35 degrees relative to the tip floor 40, and may be about 25 degrees for example.

Correspondingly, the first rib 42 has a generally constant thickness or width with its outboard and inboard surfaces being generally parallel, with the first rib and those surfaces having an acute inclination angle A of about 65 degrees. In this way, the notch angle D may be about 90 degrees.

The inclination angle of the first rib 42 and the inclination angle of the ramp along with the respective sizes thereof determines and controls the configuration of the tip notch 50 and its performance in operation.

Compared with the vertical squealer ribs and horizontal tip shelf of the patent identified in the Background section, the inclined first rib 42 and inclined ramp 48 may be varied in value of those inclinations in a tradeoff of the various affects thereof.

The primary tradeoff occurs between the inclination angle A of the first rib 42 and the inclination angle C of the ramp 48. Increasing the inclination of the rib promotes more effective sealing performance of the rib with its cooperating shroud, but correspondingly decreases the included angle D between the rib and ramp. As that included angle decreases stress concentration at the juncture or fillet between the first rib and ramp increases, as well as increases the difficulty in casting the tip notch, leading to poor casting yield.

The inclination C of the tip ramp may be increased for increasing the included angle D between the first rib and ramp, but then the size of the tip notch 50 correspondingly decreases, which decreases the available recirculation zone for the cooling air therein which reduces the cooling effectiveness thereof along the first rib.

However, with these various interrelated geometrical features of the inclined first rib and inclined ramp, optimum values thereof may be determined for each design application depending upon the configuration of the specific turbine blade and airfoil and the intended operational environment. In the preferred embodiment disclosed above, the tip ramp 48 is preferably substantially normal to the inclined first rib 42 and may vary from perpendicular therewith within a range of about plus or minus 10 degrees, for example.

The width of the tip ramp 48 between the pressure sidewall and the first rib, including the bullnose 52 and fillet 54, may range from about 20 mils to 30 mils. The thickness of the pressure and suction sidewalls of the airfoil may be about 20 to 40 mils, with the first and second tip ribs also having this nominal dimension, which is also shared in thickness by the tip floor. The ramp apertures 56 may be about 15 mils in diameter and are preferably inclined along the length or chord direction of the tip ramp as illustrated in FIGS. 1 and 3.

The tip ramp is provided locally along the pressure sidewall immediately aft of the leading edge and terminating forward of the trailing edge where space permits and where its various benefits may be used to advantage. As the tip ramp blends at the leading edge and trailing edge along the pressure sidewall of the airfoil, the straight portion of the ramp between the bullnose 52 and fillet 54 as illustrated in FIG. 3 decreases until the arcuate curvatures of the bullnose and fillet merely join each other as the tip notch 50 and bullnose 52 disappear near the leading and trailing edges.

While there have been described herein what are considered to be preferred and exemplary embodiments of the present invention, other modifications of the invention shall be apparent to those skilled in the art from the teachings herein, and it is, therefore, desired to be secured in the appended claims all such modifications as fall within the true spirit and scope of the invention.

Accordingly, what is desired to be secured by Letters Patent of the United States is the invention as defined and differentiated in the following claims in which we claim:

1. A gas turbine rotor blade comprising:
   an airfoil integrally joined with a mounting dovetail at a platform therebetween;
   said airfoil including opposite pressure and suction sidewalls extending chordally between opposite leading and trailing edges, and in span between a root adjoining said platform and an opposite tip;
   said tip including a floor bounded by integral, first and second ribs extending upwardly therefrom along said pressure and suction sidewalls, respectively, to define an open tip plenum therebetween; and
   said first rib being inclined outwardly from said tip plenum, and having a base offset inwardly from said pressure sidewall to form an outboard ramp inclined upwardly from a bullnose at said pressure sidewall to join said first rib at a fillet and define a notch extending chordally along said first rib between said leading and trailing edges.

2. A blade according to claim 1 further comprising:
   a cooling circuit disposed inside said airfoil; and
   a row of cooling apertures extending from said circuit to said ramp between said bullnose and said fillet.

3. A blade according to claim 2 wherein said first rib bounds said tip plenum at an obtuse angle with said tip floor.

4. A blade according to claim 3 wherein said ramp is disposed higher than said tip floor.

5. A blade according to claim 4 wherein said ramp is substantially straight said fillet at said first rib to said bullnose at said pressure sidewall.

6. A blade according to claim 5 wherein said first rib overhangs said ramp and terminates in substantially vertical alignment with said pressure sidewall.

7. A blade according to claim 6 wherein said second rib bounds said tip plenum at a substantially normal angle with said tip floor.

8. A blade according to claim 7 further comprising a plurality of floor apertures extending from said cooling circuit through said tip floor to said tip plenum.

9. A blade according to claim 8 wherein said ramp has an inclination angle within the range of about 10 degrees to about 35 degrees relative to said tip floor.

10. A blade according to claim 9 wherein said first rib is inclined from said tip floor at an acute angle of about 65 degrees.

11. A gas turbine rotor blade comprising:

an airfoil integrally joined with a mounting dovetail at a platform therebetween;

said airfoil including opposite pressure and suction sidewalls extending chordally between opposite leading and trailing edges, and in span between a root adjoining said platform and an opposite tip;

said tip including a floor bounded by integral first and second ribs extending upwardly therefrom along said pressure and suction sidewalls, respectively, to define an open tip plenum therebetween; and said first rib being inclined outwardly from said tip plenum, and having a offset inwardly from said pressure sidewall to form an outboard ramp extending from said pressure sidewall to said first rib and defining a substantially normal notch therebetween.

12. A blade according to claim 11 wherein said tip ramp is inclined upwardly from said pressure sidewall to join said first rib at a fillet.

13. A blade according to claim 12 wherein said first rib bounds said tip plenum at an obtuse angle with said tip floor.

14. A blade according to claim 13 wherein said second rib bounds said tip plenum at a substantially normal angle with said tip floor.

15. A blade according to claim 13 further comprising:

a cooling circuit disposed inside said airfoil; and a row of cooling apertures extending from said circuit to said ramp.

16. A blade according to claim 15 wherein said ramp is disposed higher than said tip floor.

17. A blade according to claim 15 wherein said ramp is substantially straight from said fillet at said first rib to a bullnose at said pressure sidewall.

18. A blade according to claim 15 wherein said first rib overhangs said ramp and terminates in substantially vertical alignment with said pressure sidewall.

19. A blade according to claim 15 wherein said ramp has an inclination angle within the range of about 10 degrees to about 35 degrees relative to said tip floor.

20. A blade according to claim 19 wherein said first rib is inclined from said tip floor at an acute angle of about 65 degrees.

* * * * *

UNITED STATES PATENT AND TRADEMARK OFFICE
CERTIFICATE OF CORRECTION

PATENT NO. : 6,790,005 B2
APPLICATION NO. : 10/334091
DATED : September 14, 2004
INVENTOR(S) : C. Lee et al.

It is certified that error appears in the above-identified patent and that said Letters Patent is hereby corrected as shown below:

Column 6, line 66, insert --from-- after "straight"; and
Column 7, line 28, insert --base-- after "a".

Signed and Sealed this

Eleventh Day of July, 2006

JON W. DUDAS
*Director of the United States Patent and Trademark Office*